US007102514B2

(12) United States Patent
Berry

(10) Patent No.: US 7,102,514 B2
(45) Date of Patent: Sep. 5, 2006

(54) METHODS FOR DETECTING BIOLOGICAL, CHEMICAL OR NUCLEAR ATTACKS

(76) Inventor: Kenneth M. Berry, 125 Maple Ave., Wellsville, NY (US) 14895

( * ) Notice: Subject to any disclaimer, the term of this patent is extended or adjusted under 35 U.S.C. 154(b) by 187 days.

(21) Appl. No.: 10/765,253

(22) Filed: Jan. 27, 2004

(65) Prior Publication Data

US 2004/0257227 A1    Dec. 23, 2004

Related U.S. Application Data

(63) Continuation-in-part of application No. 09/964,487, filed on Sep. 28, 2001, now Pat. No. 6,710,711.

(60) Provisional application No. 60/444,369, filed on Jan. 31, 2003, provisional application No. 60/236,730, filed on Oct. 2, 2000.

(51) Int. Cl.
*G08B 21/00* (2006.01)

(52) U.S. Cl. ............... 340/540; 340/521; 340/603; 340/632; 703/11; 703/12

(58) Field of Classification Search ............... 340/540, 340/573.1, 999, 521, 632, 601, 603; 434/11; 703/6, 11–13, 22
See application file for complete search history.

(56) References Cited

U.S. PATENT DOCUMENTS

| | | | | |
|---|---|---|---|---|
| 4,058,802 A | * | 11/1977 | Meyers | 340/603 |
| 4,135,092 A | * | 1/1979 | Milly | 250/343 |
| 4,446,370 A | * | 5/1984 | Gergely | 250/301 |
| 4,973,970 A | * | 11/1990 | Reeser | 342/357.09 |
| 5,979,565 A | | 11/1999 | Wicks et al. | |
| 6,114,964 A | * | 9/2000 | Fasano | 340/632 |
| 6,182,497 B1 | * | 2/2001 | Krajci | 340/632 |
| 6,293,861 B1 | | 9/2001 | Berry | |
| 6,539,311 B1 | * | 3/2003 | Berger | 702/23 |
| 6,664,898 B1 | * | 12/2003 | Ghahramani | 340/632 |
| 6,670,887 B1 | * | 12/2003 | Dungan | 340/632 |
| 6,687,640 B1 | * | 2/2004 | Gelbard | 702/122 |
| 6,941,806 B1 | * | 9/2005 | Burns et al. | 73/170.02 |
| 6,946,644 B1 | * | 9/2005 | Wood | 250/226 |
| 2002/0086430 A1 | * | 7/2002 | Hopmeier | 436/20 |
| 2003/0065409 A1 | * | 4/2003 | Raeth et al. | 700/31 |
| 2003/0227383 A1 | | 12/2003 | Berry | |
| 2004/0015336 A1 | * | 1/2004 | Kulesz et al. | 703/11 |
| 2005/0118704 A1 | * | 6/2005 | Malobabic | 435/287.1 |

* cited by examiner

*Primary Examiner*—Thomas Mullen
(74) *Attorney, Agent, or Firm*—Alan G. Towner, Esq.; Pletragallo, Bosick & Gordon LLP

(57) ABSTRACT

Methods are provided for detecting chemical, biological and/or nuclear attacks in large areas such as cities, states and nations. The system protects the public before significant exposure occurs, utilizing a preventive approach rather than a purely reactive approach. Modeling is conducted to selectively position sensors for the on-going collection of real-time detection data, such as contaminant types and concentrations, weather conditions, terrain data, dispersion data and the like. The detection data is compared to background data and modeled data to detect unsafe contaminant levels and immediately activate a response system. The integrated modeling and simulation component may function to interface with real-time data from the sensors providing integrated real-time plume depiction, prediction, and verification, as well as real-time response and mitigation. This is testable and serves as an advanced redundant scientific control. The response system may implement a variety of protective measures, including, but not limited to, medical response procedures for emergency rooms and hospitals, warning alarms, instructions for personal protection, sealing of buildings, introduction of positive pressure in buildings, and introduction of clean air in confined spaces. An IT infrastructure may connect the modeling, detection and response components.

50 Claims, 17 Drawing Sheets

METHODS FOR DETECTING BIOLOGICAL, CHEMICAL OR NUCLEAR ATTACKS

CROSS-REFERENCE TO RELATED APPLICATIONS

This application claims the benefit of U.S. Provisional patent application Ser. No. 60/444,369, filed Jan. 31, 2003, which is incorporated herein by reference. This application is also a continuation-in-part of U.S. patent application Ser. No. 09/964,487, filed Sep. 28, 2001, now U.S. Pat. No. 6,710,711, which claims priority from U.S. Provisional application Ser. No. 60/236,730, filed Oct. 2, 2000, which are incorporated herein by reference.

FIELD OF THE INVENTION

The present invention relates to methods for detecting chemical, biological and/or nuclear attacks in areas such as cities, states and nations, and more particularly relates to on-going, real-time sensing of such attacks.

BACKGROUND INFORMATION

In an era where chemical, biological or nuclear attacks at one or more locations either globally or within a country or region are possible, it is desirable to have a detection system capable of locating and identifying the type of attack so that a rapid preemptive response can be initiated. Such attacks can occur both as a result of enemy or terrorist activity and as a result of a chemical, biological or nuclear accident at a domestic facility. In such cases, a prompt response with medical treatment will tend to minimize injury and loss of life.

Sensors exist which will detect various chemical and biological agents as well as nuclear radiation, but these sensors are impractical because several thousands are required for effective use in a global, national, regional, or even local detection system. Sensors have been effectively used to detect hazardous airborne agent attacks on very limited areas, such as buildings or compounds, but a problem still remains as to how an attack occurring in a large area, such as a city, state, country, continent or even the world, can effectively and rapidly be identified. To this point, as illustrated by U.S. Pat. No. 5,278,539 to Lauterbach et al., and U.S. Pat. No. 5,576,952 to Stutman et al., hazardous material and medical alerts have originated from small, specific locations or from specific, affected individuals.

There is a need to coordinate and integrate preparedness efforts against chemical, biological and nuclear terrorism into a regional or nationwide preemptive sensor-based detection system. Of particular concern are weaponized and/or contagious biological agents. The current state of the biodefense industry is focused on obtaining data of ongoing signs and symptoms throughout the country—so called "syndromic detection." The thought is that when abnormal patterns emerge (e.g., possibly indicative of a bioattack) mitigation and prevention strategies could ensue much earlier than before and hence the outcome is improved. However, this fundamental model is flawed and represents essentially little change from the response paradigms of the previous centuries. This is still an after-the-fact reactive approach providing too little too late. Upon analyzing the best possible outcomes using this current methodology, the death and illness rates are still horrible and unacceptable. Such outcomes can be thwarted if a preemptive sensor-based detection system is employed.

The present invention has been developed in view of the foregoing.

SUMMARY OF THE INVENTION

The present invention provides methods for detecting chemical, biological and/or nuclear attacks in areas such as cities, states and nations. Modeling may be conducted to position sensors that continuously collect real-time detection data, such as contaminant types and concentrations, weather conditions, terrain data, dispersion data or the like. When unsafe contaminant levels are detected, a response system may be immediately activated. The response system may implement a variety of protective measures, including, but not limited to, medical response procedures for emergency rooms and hospitals, warning alarms, instructions for personal protection, sealing of buildings, introduction of positive pressure in buildings, and introduction of clean air in confined spaces. The methods of the present invention are designed to protect the public before significant exposure occurs, utilizing a preventive approach rather than a purely reactive approach. An information technology (IT) infrastructure may provide a means of communication between the modeling, detection and response components.

An embodiment of the present invention involves the initial and subsequent use of modeling and simulation components. Initially, the modeling and simulation functions are run, stored and analyzed to best determine the most optimal and efficient locations for sensors to be placed. Subsequently, multiple sensors are arrayed in a given geographic area, then real-time modeling and simulation capabilities are integrated with real-time sensor data inputs to formulate real-time dispersion plume(s) so as to enable a response in real-time before a targeted population gets exposed. Response to an identified attack may require a trained public that would assist in active preventive defense, i.e., masks, PPE, antibiotics, antidotes, etc. Additionally, as more new defensive technologies are developed and deployed, such as anti-aerosol bombs and remote ground and/or space-based diagnostic and defensive capabilities, the response may be controlled without the necessity of public involvement, e.g., either by local, state, and/or federal capabilities.

One aspect of the present invention is to provide a method for positioning contaminant sensors in an area. The method includes the steps of identifying at least one potential contaminant release location within an area, modeling a contaminant dispersion pattern using the at least one contaminant release location, and positioning at least one contaminant sensor within the area based on the contaminant dispersion pattern.

Another aspect of the present invention is to provide a method for detecting a contaminant release in an area. The method includes the steps of collecting detection data from selectively positioned contaminant sensors, and identifying the occurrence of unsafe contaminant levels.

A further aspect of the present invention is to provide a method for responding to a contaminant release. The method includes the steps of detecting a contaminant release using selectively placed sensors, and responding to the contaminant release upon its detection.

Another aspect of the present invention is to provide an array of selectively positioned sensors within an area. Sensor positions are determined by identifying at least one potential contaminant release location within an area, modeling a contaminant dispersion pattern using the at least one contaminant release location, and positioning at least one contaminant sensor within the area based on the contaminant dispersion pattern.

A further aspect of the present invention is to provide a plurality of areas established for modeling, detecting, and responding to a contaminant release, wherein the areas communicate via an IT infrastructure.

These and other aspects of the present invention will be more apparent from the following description.

DETAILED DESCRIPTION

In accordance with the present invention, methods are provided for detecting chemical, biological and/or nuclear attacks in large areas such as cities, states and nations. The methods provide continuous, real-time sensing of such attacks and immediate protective measures that mitigate human health risks, e.g., medical response procedures for emergency rooms and hospitals, warning alarms, instructions for personal protection, dispatch of medicine, sealing of buildings or the like. Additionally, the methods provide for remote ground and space-based diagnostic and "neutralizing" capabilities in the not-too-distant future (i.e., anti-aerosol bombs, remote deactivating/neutralizing laser and other anti-aerosol capabilities, etc.).

First, an area of concern ("target area") is defined. This area may comprise any large geographic tract of land, such as a city, state, country, nation, continent or even the world. Within this large area, sub-areas may be defined, and these sub-areas may be further divided as needed until the target area is segmented into manageable parts. For example, if the initial target area is a country, the sub-areas may comprise individual states within the country, and each state may be further subdivided into counties or cities. Next, a system is established in each sub-area for modeling, detecting and responding to contaminant releases within, or in the general vicinity of, that sub-area. All sub-area systems within the target area may be connected through an IT infrastructure. The individual system for each sub-area may contain a network of modeling locations, sensor locations for collecting detection data, and points of response, which are connected to a central processing unit. The central processing unit may control the system for that sub-area, and may be connected to a master processing unit, which controls all systems for the entire target area. The electronic network that connects the system components, including the central processing units and the master processing unit, is known as the IT infrastructure. The IT infrastructure may comprise computer and telecommunications features.

Figure 1:
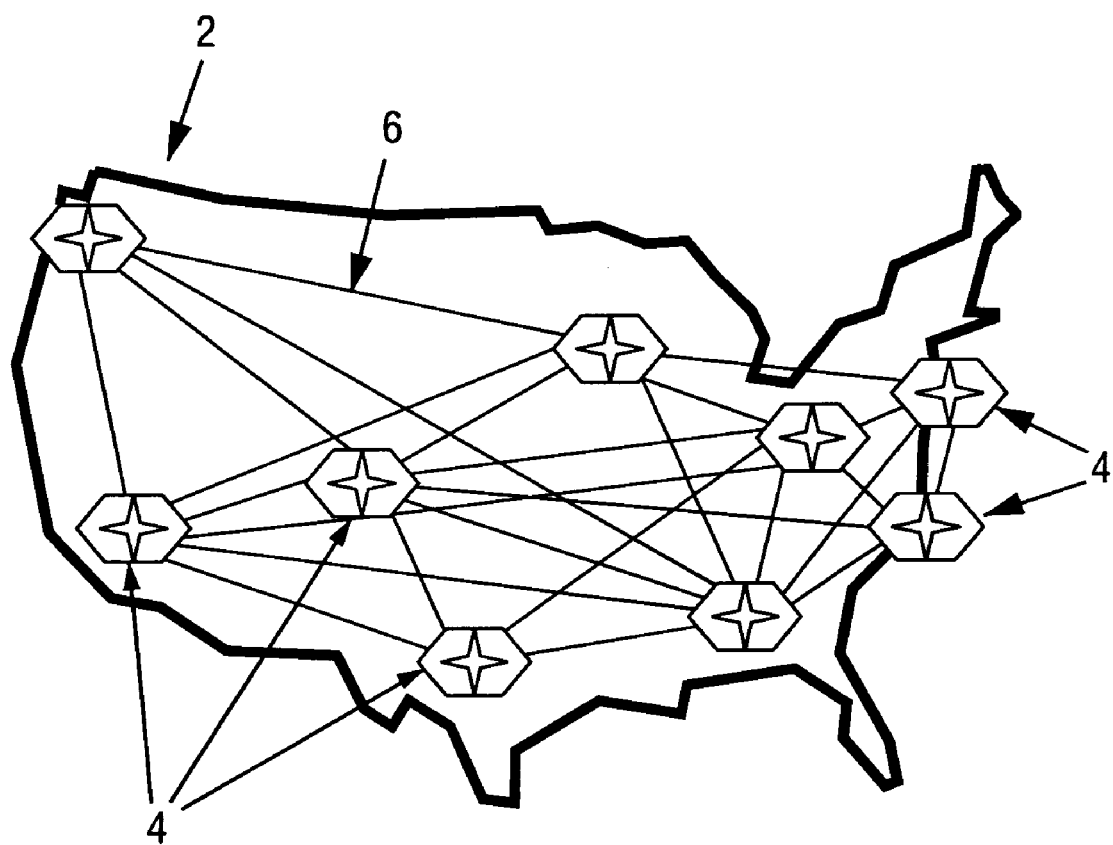
FIG. 1 is a schematic diagram depicting a target area, sub-areas and IT infrastructure in accordance with an embodiment of the present invention.

FIG. 1 is a schematic diagram illustrating a typical scenario in which the target area 2 comprises the United States and the sub-areas 4 comprise individual cities located throughout the United States. Each sub-area 4 may contain its own individual system for modeling, detecting, and responding to contaminant releases, which is connected to the systems in other sub-areas through an IT infrastructure 6.

In accordance with a particular embodiment of the present invention, modeling is conducted to selectively position sensors that continuously collect real-time detection data, such as contaminant types and concentrations, weather conditions, terrain data, dispersion data and the like. Contaminants may comprise any hazardous substance or agent, such as a chemical, biological, nuclear or radiological agent, alone or in combination with other hazardous substances or agents. The detection data is compared to background data and modeled data to identify unsafe contaminant levels. When unsafe contaminant levels are detected, a response system is immediately activated. The response system may implement a variety of protective measures, including, but not limited to, medical response procedures for emergency rooms and hospitals, warning alarms, instructions for personal protection, sealing of buildings, introduction of positive pressure in buildings, and introduction of clean air in confined spaces. The response system may be selectively implemented for distinct areas within the area of concern, or for the entire area of concern itself. The response system is designed to protect the public before significant exposure occurs, utilizing a preventive approach rather than a reactive approach. The IT infrastructure provides a means of communication between all system components located throughout the area of concern.

Figure 2:
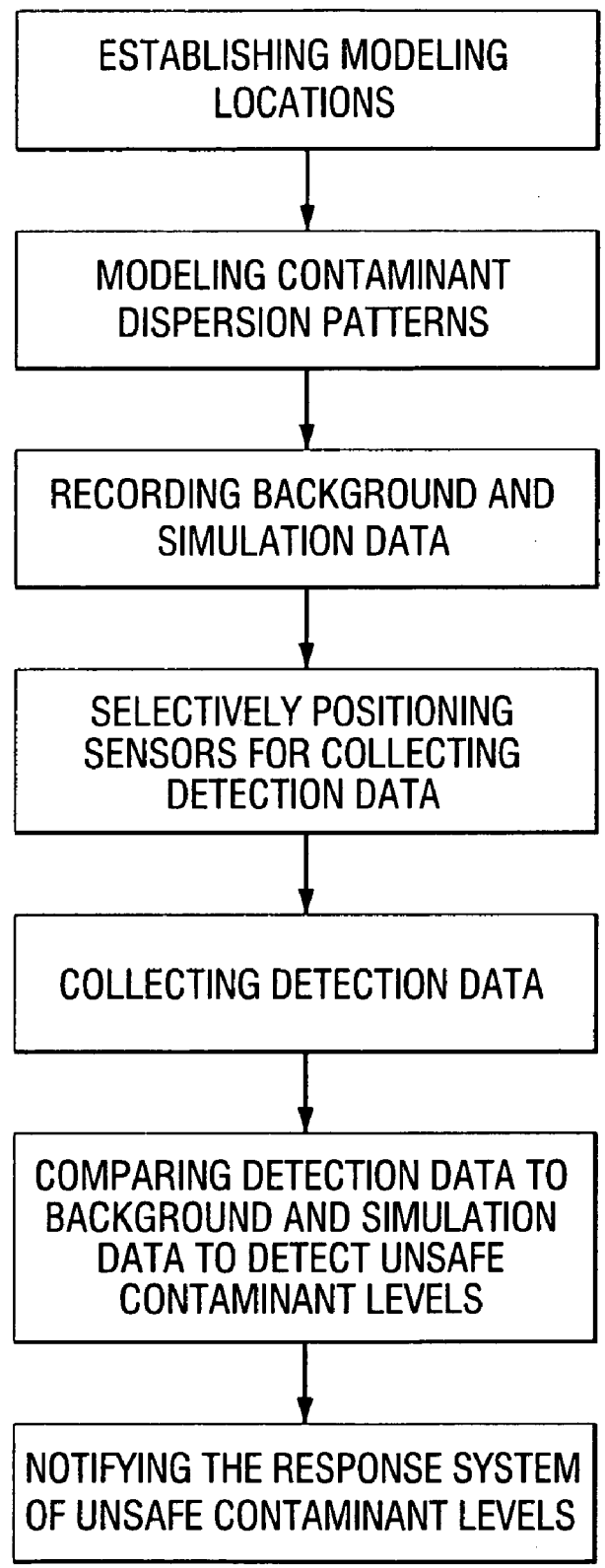
FIG. 2 is a flow diagram illustrating a typical method that may be used in accordance with a detection system of the present invention.

FIG. 2 is a flow diagram illustrating a typical method that may be used in accordance with a particular embodiment of the present invention. The method includes establishing modeling locations within the area of concern, modeling contaminant dispersion patterns, recording background and simulation data at the modeling locations, selectively positioning sensors at locations for the optimal collection of detection data, collecting detection data, comparing the detection data to the background and simulation data to detect unsafe contaminant levels, and notifying the response system of unsafe contaminant levels.

Figure 3:
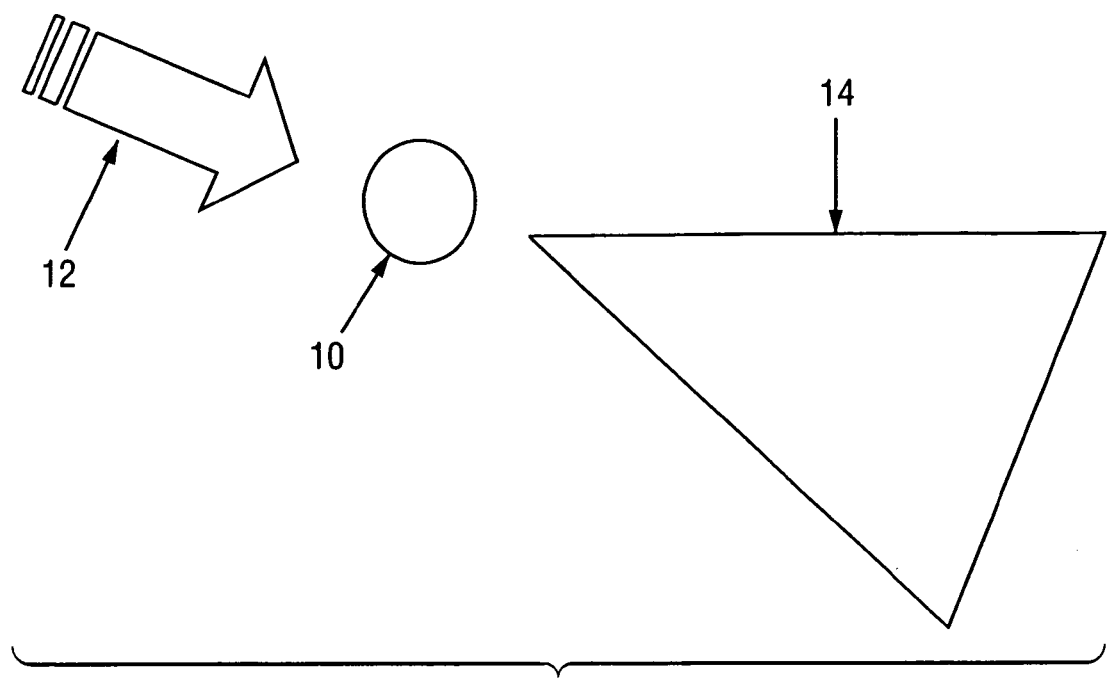
FIG. 3 is a schematic diagram depicting a point source of contamination.

A significant component of the present invention is on-going, periodic modeling (i.e., simulation) of expected patterns of contaminant dispersion, also known as dispersion plumes. During an attack, a chemical, biological or nuclear agent may be released in a number of different ways, including release from the air, on the land, or in the sea. The agent may be released from a stationary source, resulting in a "point source" of contamination 10 as shown in FIG. 3. The point source 10 is affected by environmental factors such as wind speed and direction 12 to produce a zone of contamination 14.

Figure 4:
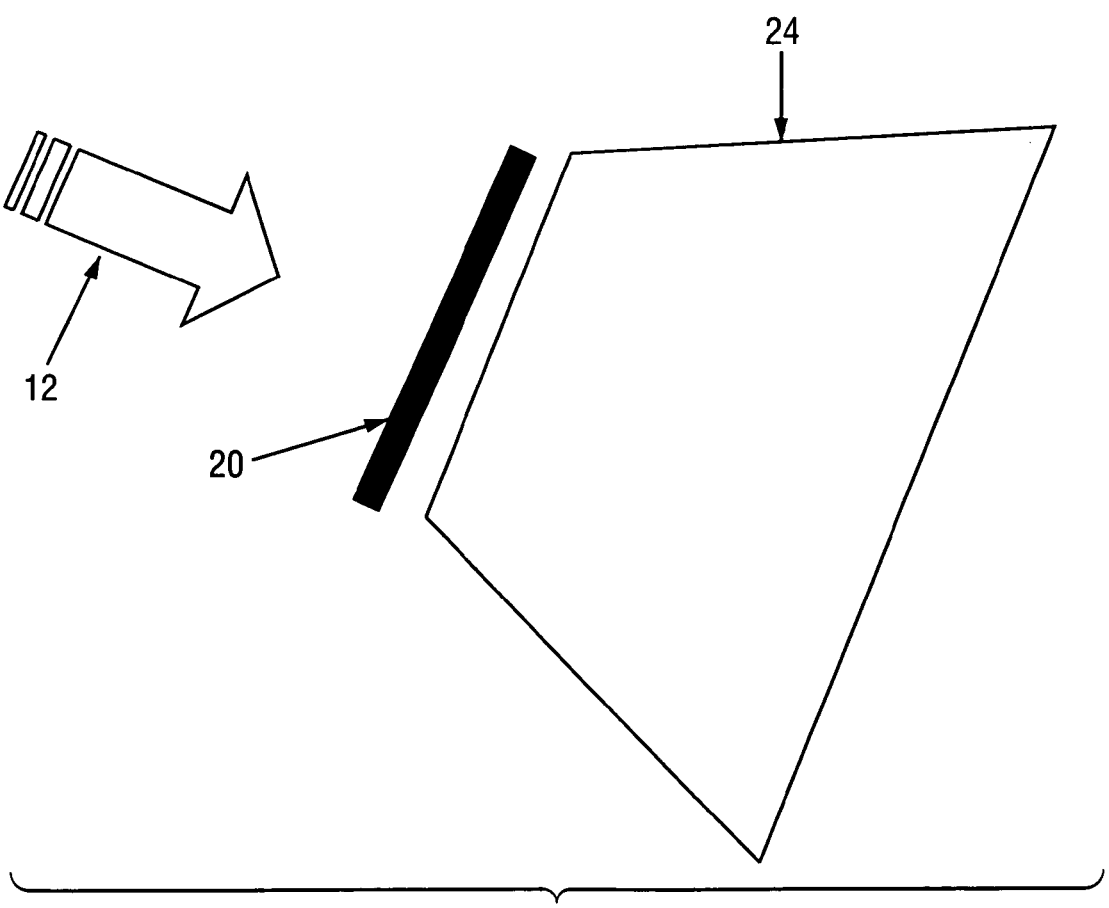
FIG. 4 is a schematic diagram depicting a line source of contamination.

Alternatively, the agent may be released from a moving source, resulting in a "line source" of contamination 20 as shown in FIG. 4. The line source 20 is affected by environmental factors such as wind speed and direction 12 to produce a zone of contamination 24.

The dispersion pattern of the agent will depend on the type of agent released, the concentration of the agent released, the geographic location of the release, weather patterns in the vicinity of the release including wind speed and direction, dispersion physics, and whether the release occurred as a point source or a line source. Thus, the release of a chemical, biological or nuclear agent may be accomplished using a variety of attack scenarios, and multiple dispersion patterns may occur for any given contaminant.

To account for changing weather conditions, the present invention may periodically generate new models over time. Each separate modeling event is referred to as a "run." To account for changing attack scenarios, the present invention may generate multiple models for each modeling event or run, taking into account variations in contaminant type, contaminant concentration, and source of release (point source or line source), etc. This detailed and continuous modeling increases the probability of accurately detecting an attack before significant exposure occurs through enabling more accurate and efficient positioning of sensors via analysis of stored data. The modeling process also involves establishing normal background conditions for the area of concern.

Figure 5:
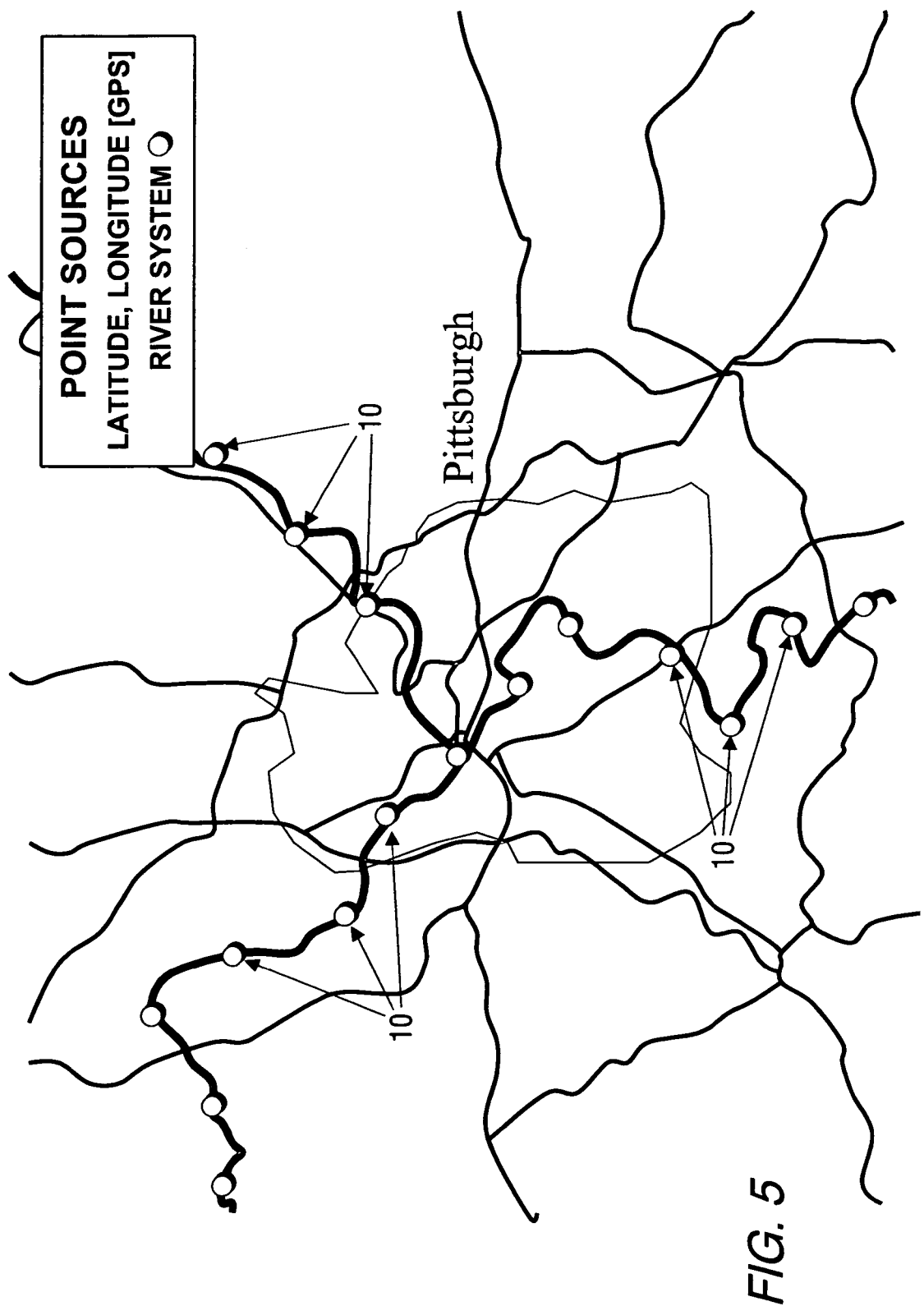
FIG. 5 is a plan view of point sources of contamination along a river system.
Figure 6:
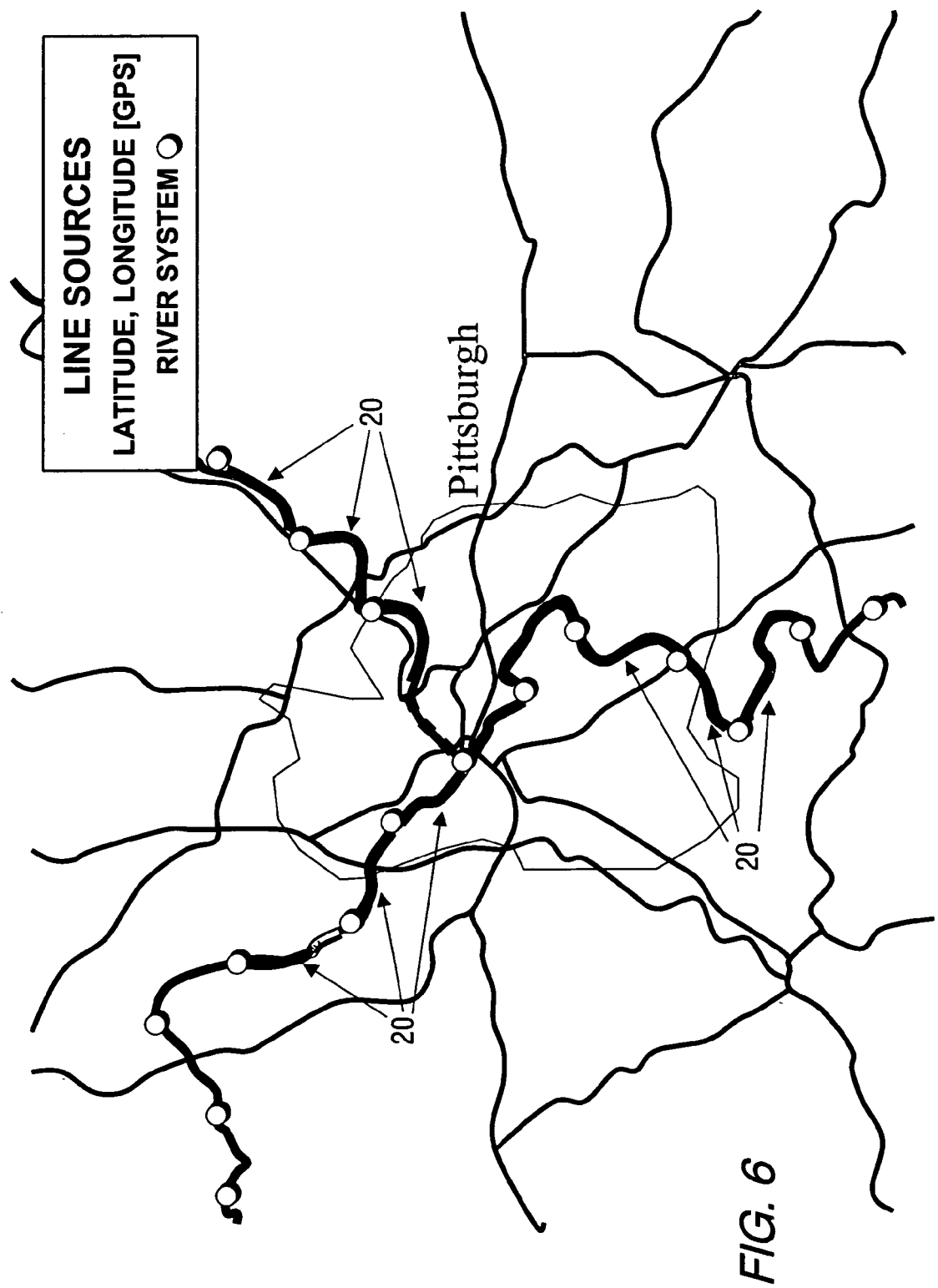
FIG. 6 is a plan view of line sources of contamination along a river system.
Figure 7:
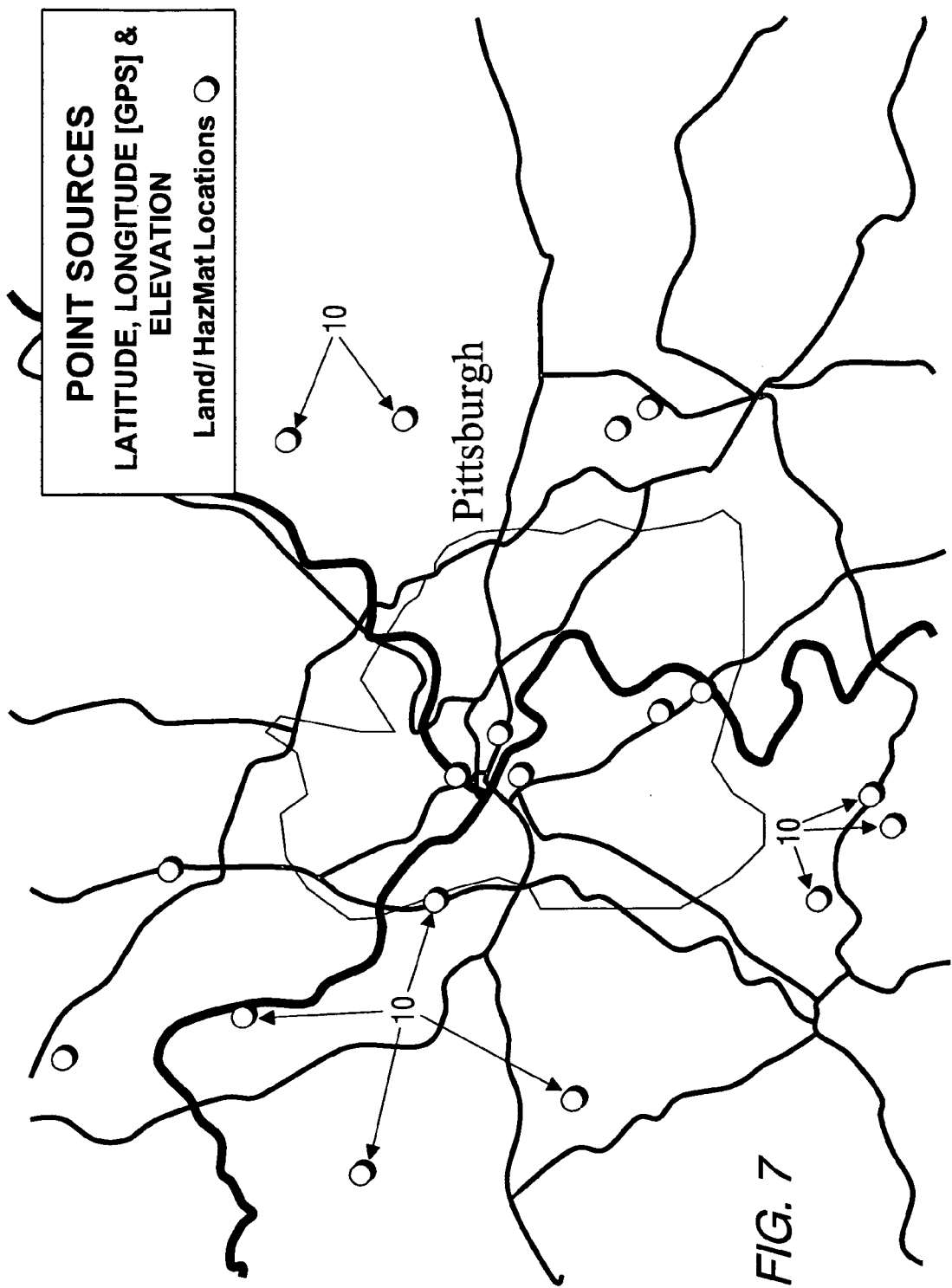
FIG. 7 is a plan view of point sources of contamination at landfills and hazardous materials locations.
Figure 8:
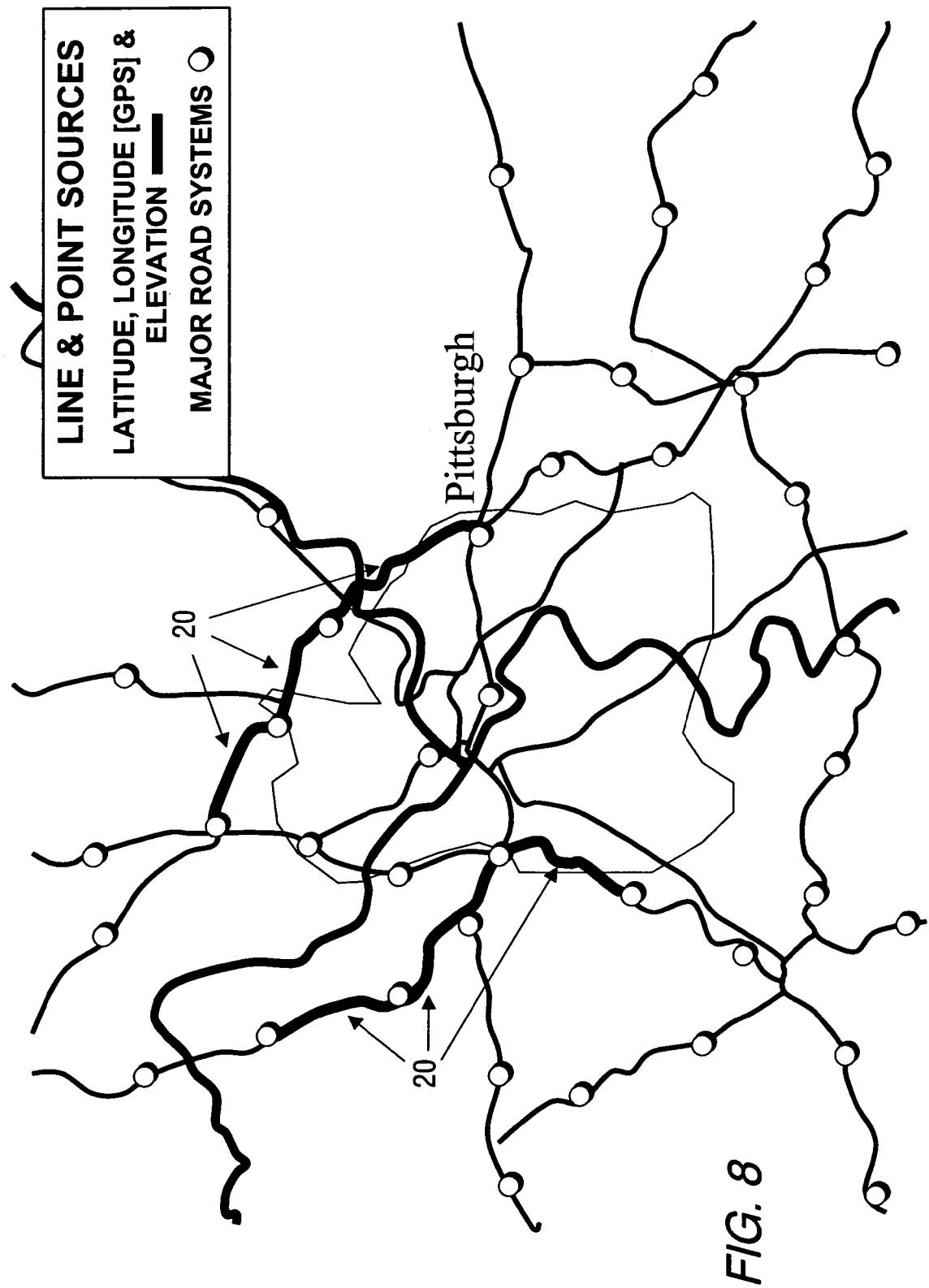
FIG. 8 is a plan view of point and line sources of contamination along road systems.

Modeling locations may be established throughout each sub-area or across the entire target area of concern. Point sources may be located at random locations or at regular intervals, e.g., according to a grid or the like. Line sources may comprise straight lines or curved and irregular lines that follow wind direction, roadways, the flow direction of surface water, rivers, or streams, or the like. The position of the modeling locations may change over time. Existing locations may be adjusted or eliminated and new locations may be added as needed. Using a city as an example, modeling locations could be strategically positioned along mass transit systems, rivers, harbors and roadways, or at known sources of hazardous materials, mass gathering locations, or symbolic cultural entities and events. FIG. 5 illustrates the typical positioning of point sources of contamination 10 along a river system that surrounds a city. FIG. 6 illustrates the typical positioning of line sources of contamination 20 along the same river system. FIG. 7 illustrates point sources 10 positioned at landfill and hazardous materials locations surrounding the city. FIG. 8 illustrates point 10 and line 20 sources along major road systems surrounding the city.

Figure 9:
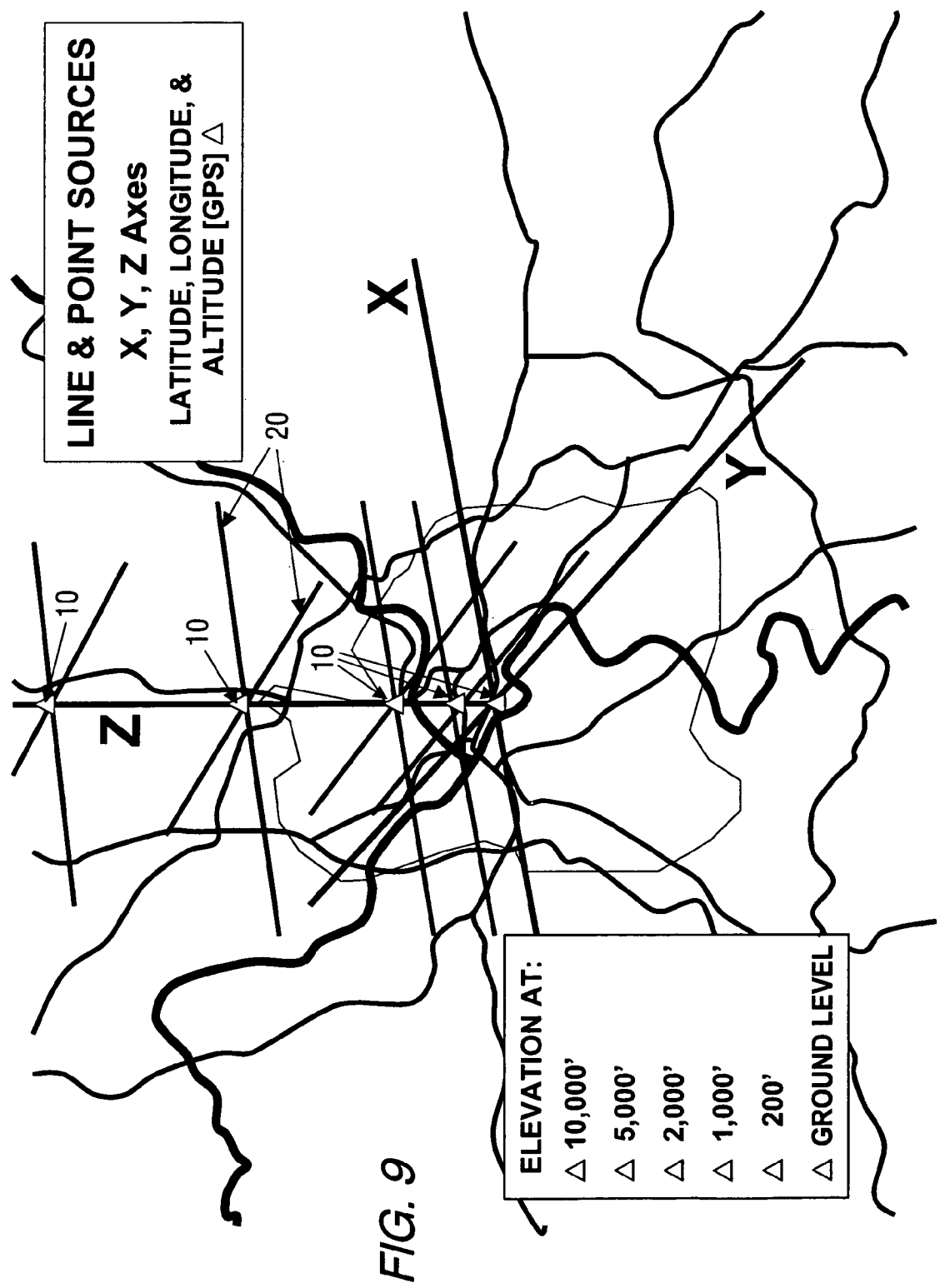
FIG. 9 is a schematic diagram illustrating point and line sources of contamination positioned at varying elevations.
Figure 10:
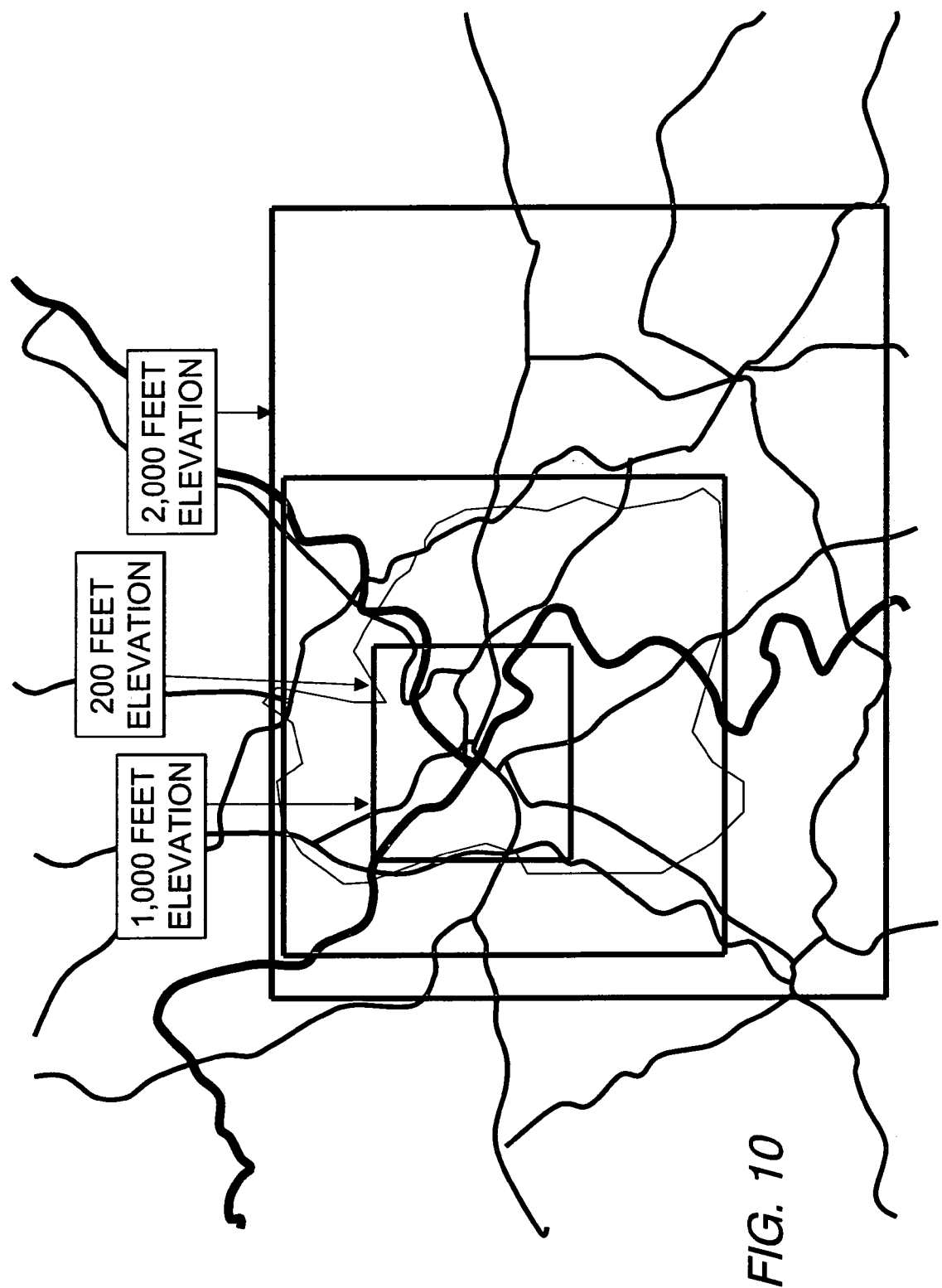
FIG. 10 is a schematic diagram illustrating the positioning of modeling locations at varying elevations in accordance with an embodiment of the present invention.

Modeling locations may also be positioned in the air space above the city or in the vicinity of the city at varying elevations. FIG. 9 depicts multiple point 10 and line 20 sources positioned at varying elevations for a single latitude and longitude location in the center of the city. FIG. 10 illustrates a strategy in which modeling locations are positioned at increasing elevations with increasing radial distance from the center of the city.

Figure 11:
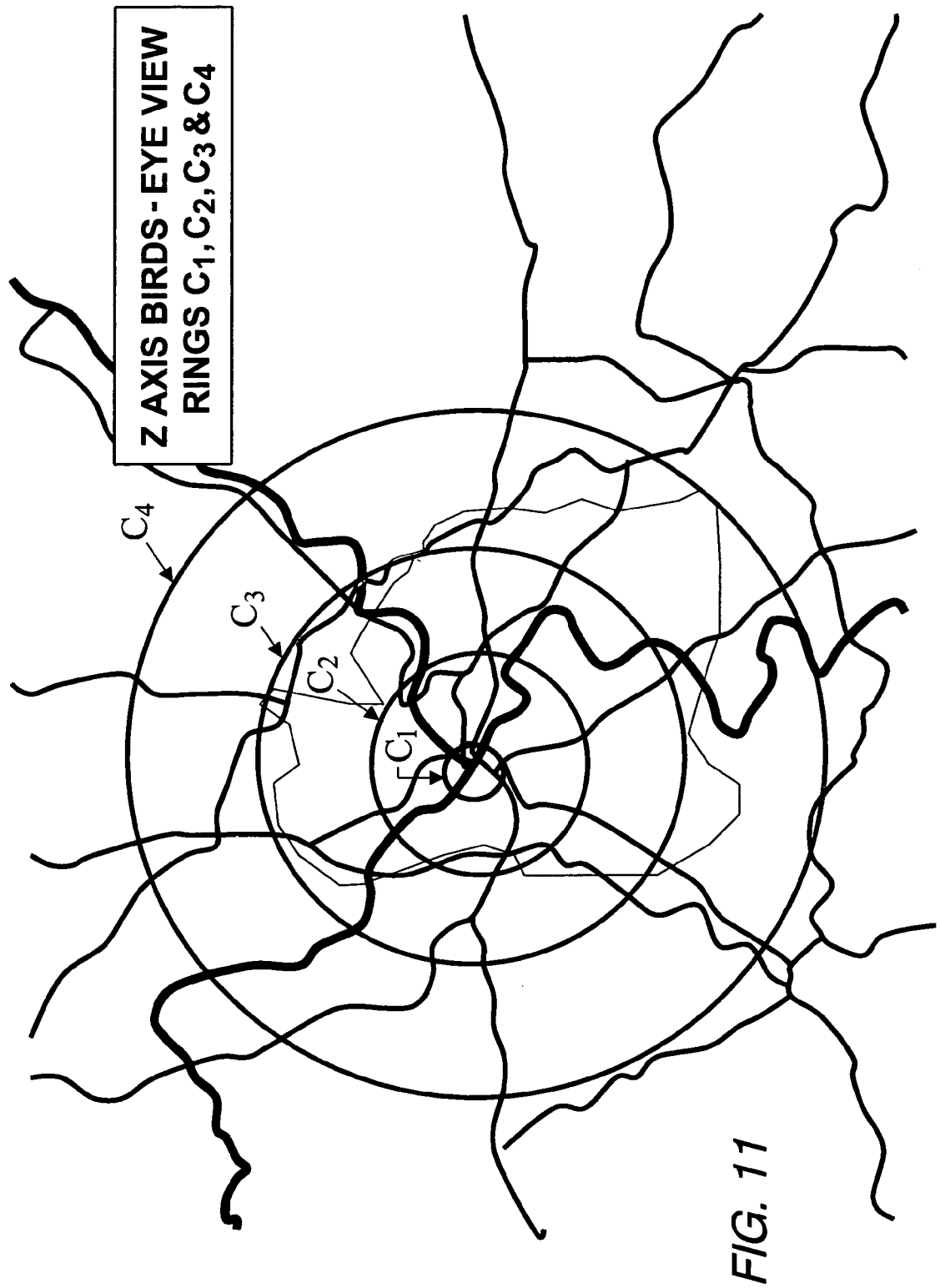
FIG. 11 is a schematic diagram illustrating the positioning of modeling locations in concentric circles in accordance with an embodiment of the present invention.
Figure 12:
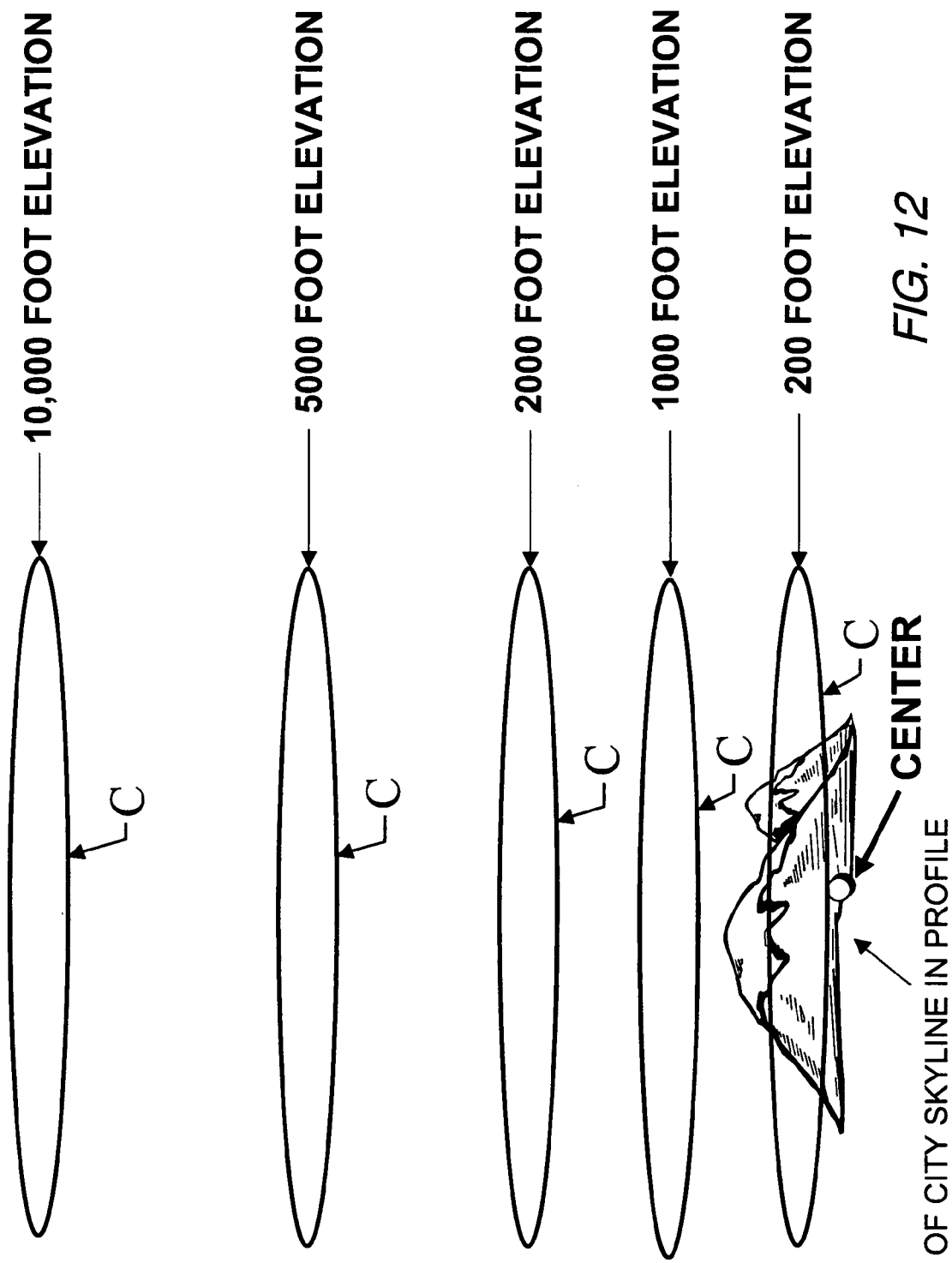
FIG. 12 is a schematic diagram illustrating the positioning of modeling locations at varying elevations in accordance with an embodiment of the present invention.

FIG. 11 illustrates a strategy in which modeling locations are positioned in concentric circles $C_1$, $C_2$, $C_3$ and $C_4$ around the center of the city. For each concentric circle C, modeling locations may be established at multiple elevations as shown in FIG. 12.

Figure 13:
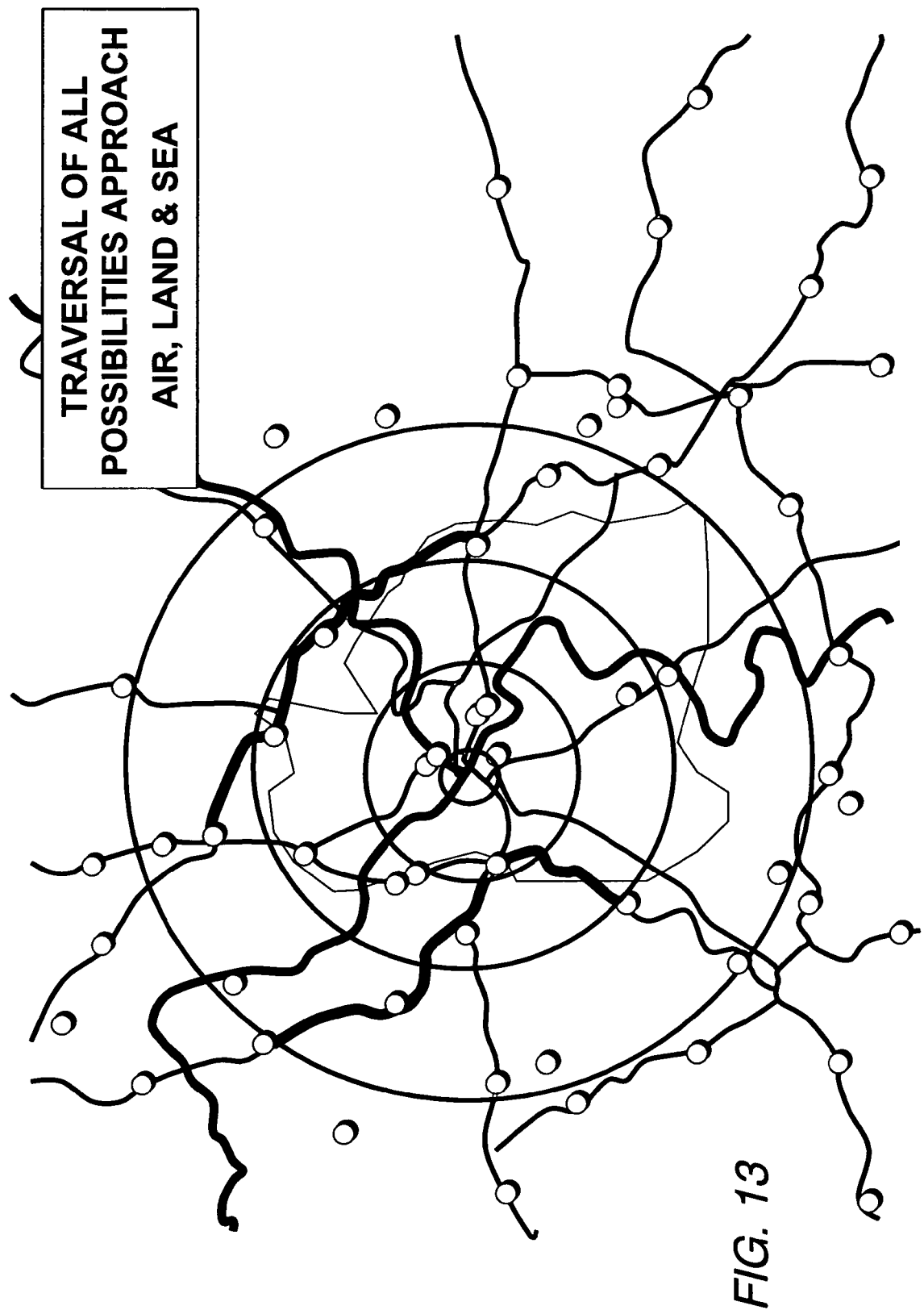
FIG. 13 is a schematic diagram depicting a comprehensive modeling strategy in accordance with an embodiment of the present invention.

FIG. 13 illustrates a comprehensive modeling strategy that incorporates point and line locations along river systems, major road systems, and HAZMAT locations, and along concentric circles around the center of the city. This strategy is a "traversal of all possibilities" approach of multiple attack scenarios in which contamination is spread by air, land and water routes around the city. While this description primarily refers to modeling locations for a city, similar strategies may be employed for counties, states, countries, or other areas of concern. The present disclosure focuses on a city merely to provide an example of one specific embodiment of the present invention.

At each modeling location, various parameters may be measured or collected as input data for the model. These parameters may include, but are not limited to, weather conditions such as wind speed, wind direction, precipitation, temperature, barometric pressure and humidity, terrain data such as elevation, slope and vegetation, and ambient air data such as pollution levels and background levels of chemicals, radiation and naturally occurring constituents. The modeling process may combine one or more of these parameters with information about the contaminant type (e.g., toxicology information, molecular weight,. solubility, density, pressure and state) assuming a given concentration and volume. Background conditions are defined by background data, and each model is defined by simulation data, which the system may generate and record for later use in detecting chemical, biological and nuclear contaminants. The background data describes typical conditions within the area of concern when no contaminant release has occurred. These background conditions may include concentrations of naturally occurring constituents and typical weather patterns (e.g., typical wind speed and temperature). The simulation data describes the pattern of dispersion when a hypothetical contaminant release has occurred, and may comprise modeled contaminant concentrations at varying latitudes, longitudes and elevations.

There are a number of known, state of the art systems that can provide the modeling and simulation component of the present invention. These systems include, but are not limited to, Hazard Predictions and Assessment (HPAC) prepared by Defense Threat Reduction Agency and Science Applications International Corporation of San Diego, Calif., and Consequences Assessment Tool Set (CATS) prepared by Science Applications International Corporation. These systems include software packages that model dispersion patterns and may also quantify the probabilistic ranges of toxicological effects of human exposure to hazardous contaminants, as well as resulting logistical requirements.

Another component of the present invention is the continuous collection of real-time detection data, which may comprise contaminant types and concentrations, weather conditions, terrain data, dispersion data or the like. Continuous detection refers to an on-going series of detection events that provide a real-time snapshot of conditions within the area of concern. The term "detection" collectively refers to all sampling and analysis or sensing (or simulated data) activities that may retrieve or collect detection data. The frequency of detection events may vary, depending on the area of concern, weather conditions and the nature of the suspect contaminants.

Figure 14:
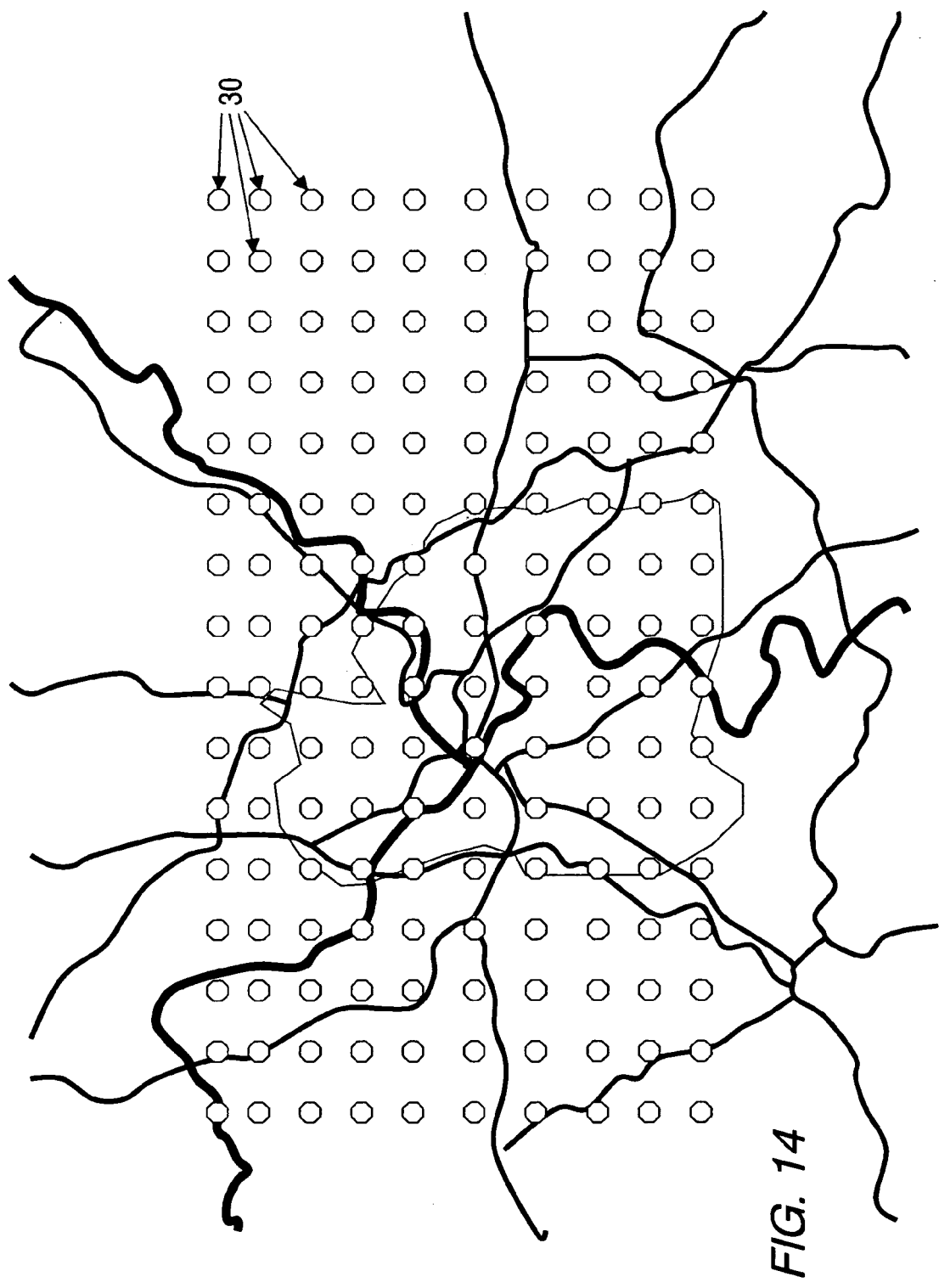
FIG. 14 is a schematic diagram depicting the spacing of sensors in accordance with an embodiment of the present invention.
Figure 15:
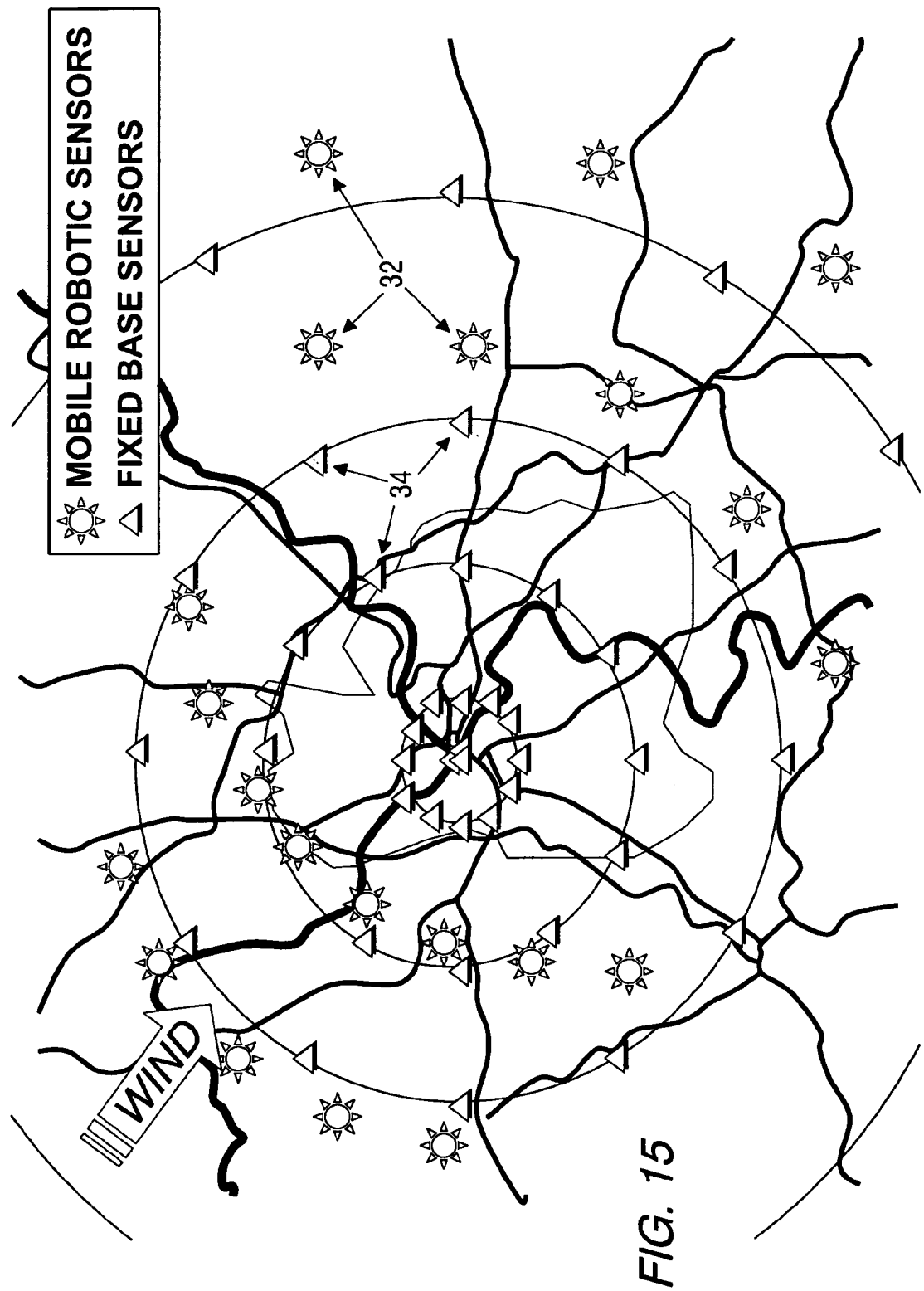
FIG. 15 is a schematic diagram illustrating the positioning of fixed and mobile sensors in accordance with an embodiment of the present invention.
Figure 16:
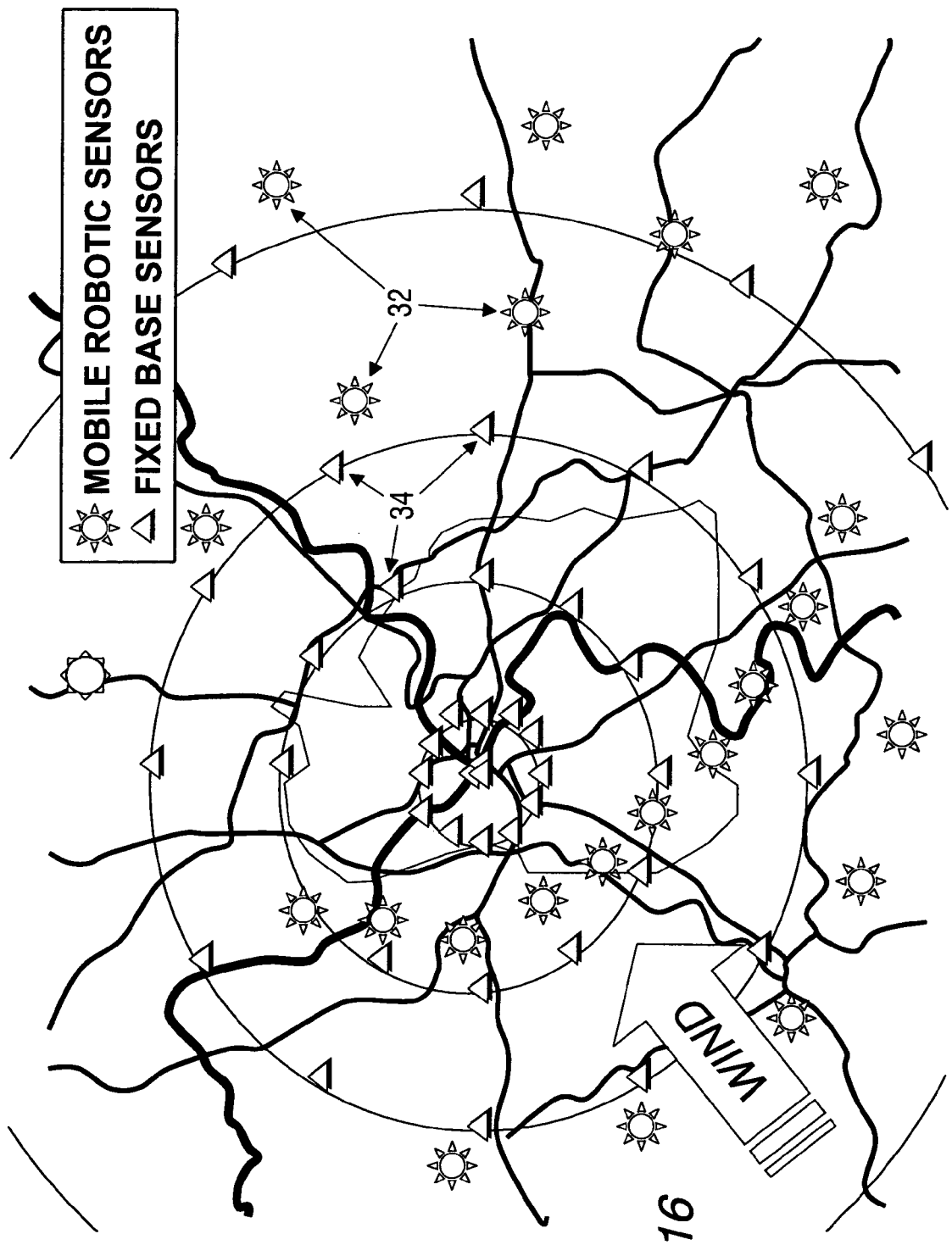
FIG. 16 is a schematic diagram illustrating the positioning of fixed and mobile sensors in accordance with an embodiment of the present invention.
Figure 17:
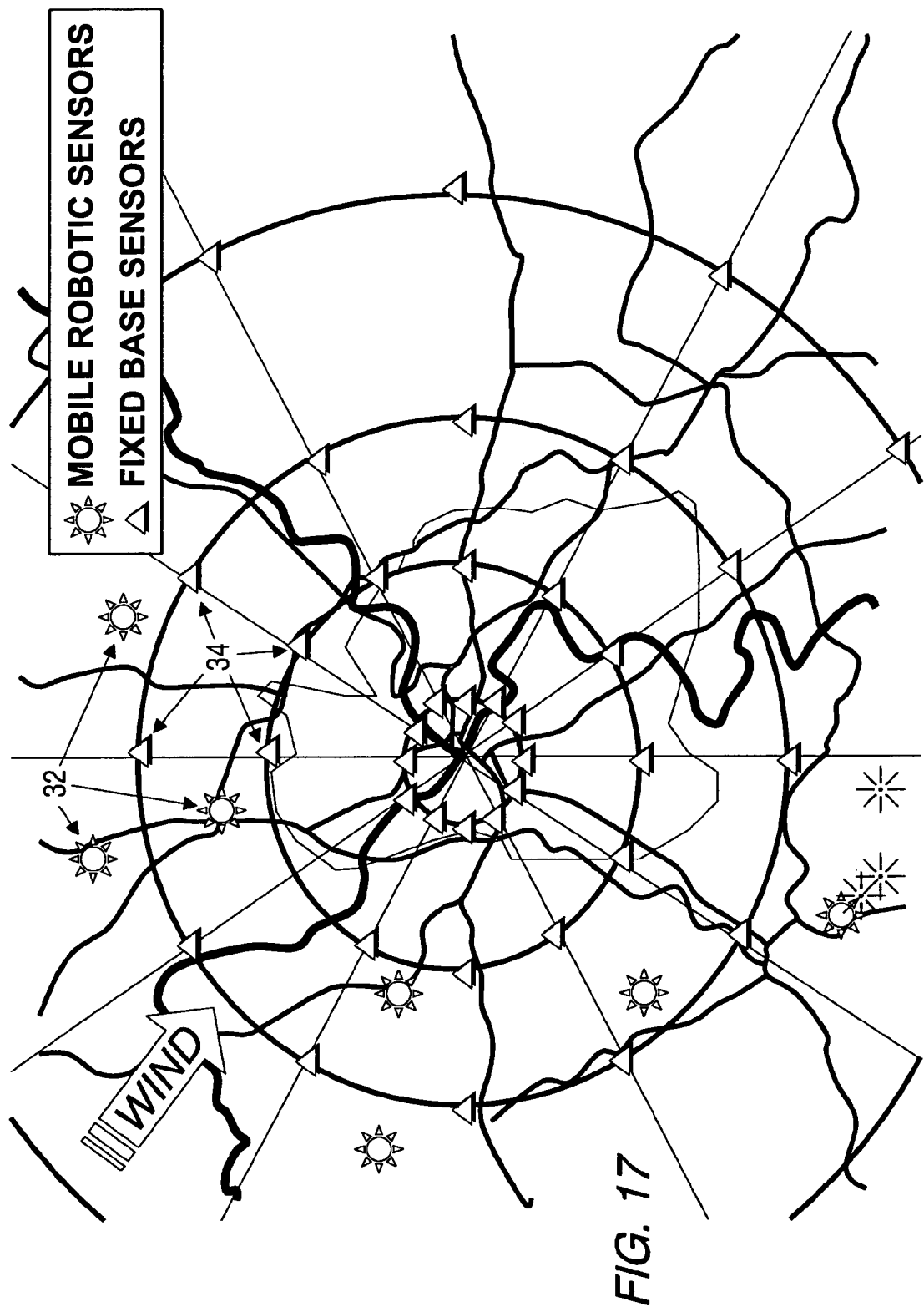
FIG. 17 is a schematic diagram illustrating the positioning of fixed and mobile sensors in accordance with an embodiment of the present invention.
Figure 18:
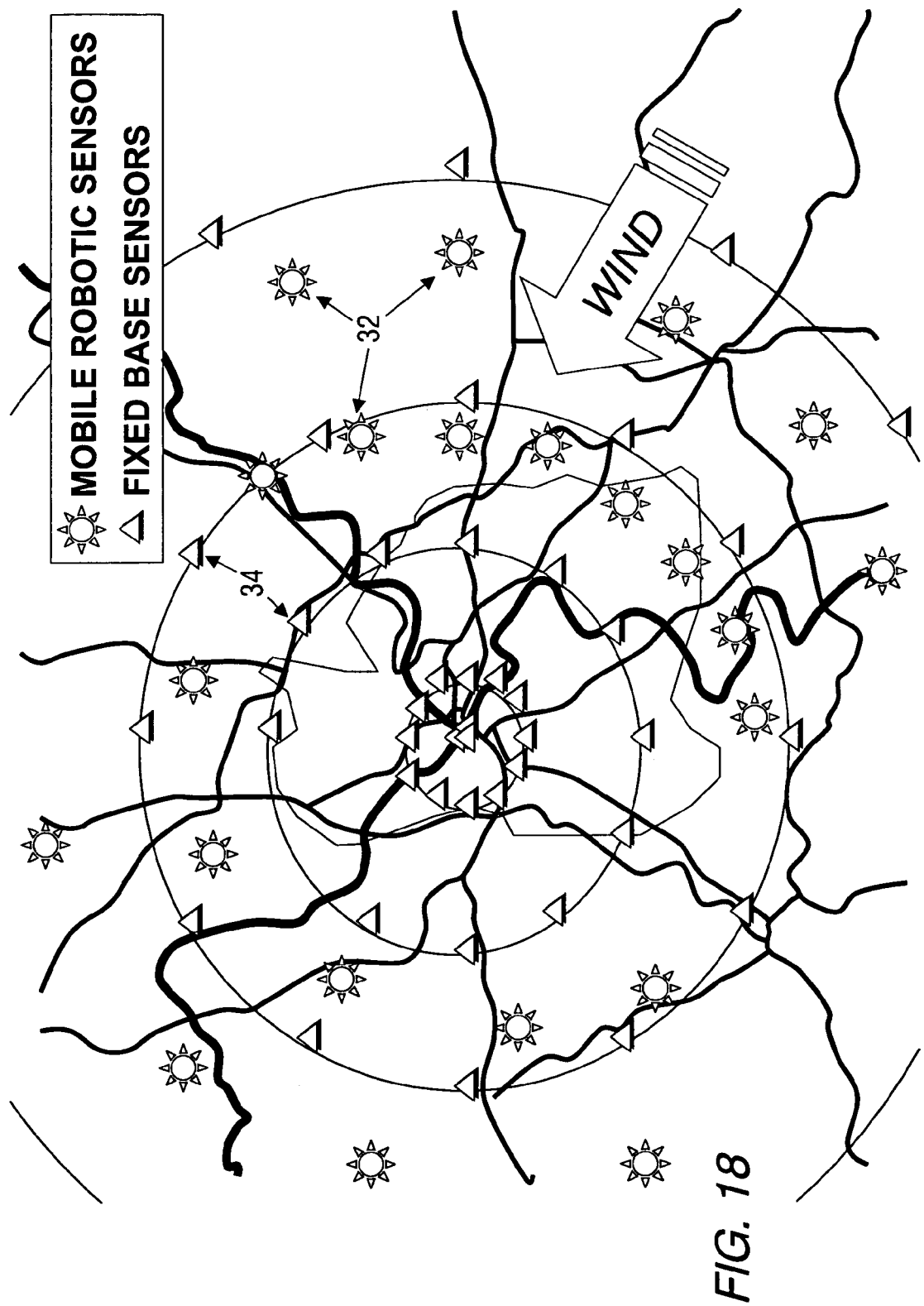
FIG. 18 is a schematic diagram illustrating the positioning of fixed and mobile sensors in accordance with an embodiment of the present invention.

Detection data is collected at "sensor locations," the position of which may be established before or after modeling has occurred and has been analyzed. If modeling has not yet occurred, sensor locations 30 may be positioned randomly, at evenly spaced intervals, e.g., in a grid-like formation as shown in FIG. 14, or according to a best guess format. If modeling with data analysis has occurred, the analyzed modeled simulation data may be used to determine the most effective placement of sensor locations.

The sensor locations may be stationary or mobile or a combination thereof, and their positions may change over time. Existing sensor locations may be adjusted or eliminated and new locations may be added as needed. Mobile (i.e., robotic, etc.) sensors 32 and stationary sensors 34 may be strategically positioned to account for variations in wind direction, as shown in FIGS. 15–18. The sensor locations may be positioned at varying latitudes, longitudes and elevations. In one embodiment of the present invention, a sensor location may be placed on an airplane that periodically collects data from both high and low altitudes. In addition, the actual sensing device may be physically located at the sensor location, or detection data may be remotely collected using a laser scan or similar technology. Remote data collection may be accomplished using a stationary sensing device that is located some distance from the sensor location, or using a moving sensing device capable of collecting data from multiple sensor locations.

Sensors may include, but are not limited to, the following types: optically based sensors, infrared sensors, reagentless optical sensors, bio-chip sensors, fiber optic sensors, direct sensors and/or sensing arrays. These sensors may be remotely reprogrammable in the event that enemy technology is developed to bypass the sensors.

In addition, the sensor locations may be established for periodically sampling the air, groundwater, surface water, sediment and/or soil. These samples may be sent for analysis at a laboratory or analyzed on-site for chemical, biological and nuclear contaminants. In addition, detection data may be obtained from sensors that detect weather conditions such as wind flow, wind direction, precipitation, temperature, barometric pressure and humidity, and ambient air data such as pollution levels and background levels of chemicals, radiation and naturally occurring constituents. These parameters may be combined with information about the contaminant type (e.g., toxicology information, molecular weight, solubility, density, pressure and state), concentration and volume.

In accordance with a particular embodiment of the present invention, the detection system may be augmented with a secondary system that collects and analyzes syndromic data for humans, plants and animals (i.e., delayed data). This secondary system may serve as a back-up in the event the primary detection system fails. The secondary system may also serve as a periodic system check to gauge the effectiveness of the primary system. The secondary system may incorporate an analytical methodology known as GLOBDISS (the Global Disease Detection System), which is described in U.S. patent application Ser. No. 09/964,487, now U.S. Pat. No. 6,710,711, the contents of which are incorporated herein by reference. System checks may also be accomplished using extrapolation or empirical methods.

Another component of the present invention is the detection of a contaminant release through comparison of actual conditions to modeled conditions or background conditions. This is accomplished using expert or artificial intelligence software that immediately signals the response system when the detection data resembles the modeled simulation data or deviates from background data. When this occurs, a contaminant release is likely, and the response system is activated to protect against human exposure. The background and simulation data may be stored and retrieved from previous modeling events, or retrieved in real-time during an on-going modeling event.

When unsafe contaminant levels are detected, a response system may be immediately notified, e.g., using an IT infrastructure. The response system then activates protective measures, including, but not limited to, medical response procedures for emergency rooms and hospitals, warning alarms, instructions for personal protection, law enforcement procedures, closing of roads, airways and other routes of travel, dispatch of medicine, dispatch of medical equipment and/or personnel, sealing of buildings, introduction of positive pressure in buildings, and introduction of clean air in confined spaces. The response system is designed to protect the public before significant exposure occurs, utilizing a preventive approach rather than a reactive approach. In a preferred embodiment, the response system immediately and instantaneously implements protective measures. However, depending on the circumstances, the response system may also implement protective measures on a delayed or periodic basis.

The response system activates its protective measures by sending signals through the IT infrastructure or any other suitable system to established points of response. These points of response may be positioned at hospitals, buildings, residences, public areas, roadways, airports or the like, depending on the type of protective measure being employed. In addition, individuals or vehicles may be equipped with personal response systems that connect with the main response system, providing alerts, updates and instructions. U.S. Pat. No. 5,979,565 (Automatic Response Building Defense System and Method) and U.S. Pat. No. 6,293,861 (Emergency Ventilation System for Biological/Chemical Contamination), which are incorporated herein by reference, disclose response measures involving positive-pressure building protection.

In accordance with a particular embodiment of the present invention, an IT infrastructure may utilize computer and telecommunications technology to connect the modeling, detection and response systems. The IT infrastructure may also connect individual sub-area systems with a central processing unit for the sub-area and the master processing unit for the target area.

Whereas particular embodiments of this invention have been described above for purposes of illustration, it will be evident to those skilled in the art that numerous variations of the details of the present invention may be made without departing from the invention.

What is claimed is:

1. A method for positioning contaminant sensors in an outdoor area, the method comprising:

identifying at least one potential contaminant release location within the outdoor area;

modeling a contaminant dispersion pattern using the at least one contaminant release location; and positioning at least one of the contaminant sensors within the outdoor area based on the contaminant dispersion pattern.

2. The method of claim 1, wherein the at least one contaminant release location comprises a point source.

3. The method of claim 1, wherein the at least one contaminant release location comprises a line source.

4. The method of claim 1, further comprising obtaining input data for the modeling from the at least one contaminant release location.

5. The method of claim 4, wherein the input data comprises at least one hypothetical contaminant concentration.

6. The method of claim 4, wherein the input data comprises weather conditions.

7. The method of claim 4, wherein the input data comprises wind speed and/or wind direction.

8. The method of claim 1, wherein the contaminant dispersion pattern is defined by simulation data.

9. The method of claim 8, wherein the simulation data comprises contaminant concentration, latitude, longitude, and elevation.

10. The method of claim 1, further comprising collecting background data that defines normal conditions in the outdoor area.

11. The method of claim 1, wherein the modeling is continuous.

12. The method of claim 1, wherein the modeling is periodic.

13. The method of claim 1, wherein the at least one contaminant sensor detects biological, chemical and nuclear contaminants.

14. The method of claim 1, wherein the at least one contaminant sensor is mobile.

15. The method of claim 1, wherein the at least one contaminant sensor is stationary.

16. The method of claim 1, further comprising:
collecting detection data from the at least one sensor; and
identifying the occurrence of unsafe contaminant levels.

17. The method of claim 16, further comprising responding to the occurrence of unsafe contaminant levels.

18. A method for detecting a contaminant release in an outdoor area, the method comprising:
selectively positioning contaminant sensors within the outdoor area based on a modeled contaminant dispersion pattern in the outdoor area;
collecting detection data from the selectively positioned contaminant sensors; and
identifying the occurrence of unsafe contaminant levels.

19. The method of claim 18, wherein the detection data comprises biological, chemical and/or nuclear contaminant concentrations.

20. The method of claim 18, wherein the detection data comprises weather conditions.

21. The method of claim 18, wherein the detection data comprises wind speed and/or wind direction.

22. The method of claim 18, wherein the contaminant sensors comprise optically based sensors, infrared sensors, reagentless optical sensors, bio-chip sensors, fiber optic sensors and/or direct sensors.

23. The method of claim 18, wherein the contaminant sensors are remotely reprogrammable.

24. The method of claim 18, wherein the contaminant sensors are remotely positioned.

25. The method of claim 18, wherein the detection data is continuously collected.

26. The method of claim 18, wherein the detection data is periodically collected.

27. The method of claim 18, wherein the contaminant sensors sampling sample air, groundwater, surface water, sediment and/or soil.

28. The method of claim 18, further comprising collecting background data that defines normal conditions in the outdoor area.

29. The method of claim 18, further comprising real-time modeling of contaminant dispersion patterns.

30. The method of claim 18, wherein unsafe contaminant levels are detected by comparing the detection data to a modeled dispersion pattern.

31. The method of claim 18, wherein the unsafe contaminant levels are detected by comparing the detection data to background data that defines normal conditions in the outdoor area.

32. The method of claim 18, further comprising signaling a response system when unsafe contaminant level are identified.

33. The method of claim 18, further comprising collecting and analyzing syndromic data from humans, plants and/or animals.

34. The method of claim 18, wherein the sensors are selectively positioned by:
identifying at least one potential contaminant release location within the outdoor area; and
modeling a contaminant dispersion pattern using the at least one contaminant release location.

35. A method for responding to a contaminant release in an outdoor area, the method comprising:
selectively positioning contaminant sensors within the outdoor area based on a modeled contaminant dispersion pattern in the outdoor area;
detecting a contaminant release using the selectively placed sensors; and
responding to the contaminant release upon its detection.

36. The method of claim 35, wherein a contaminant release is detected by collecting detection data from the selectively positioned contaminant sensors and identifying the occurrence of unsafe contaminant levels.

37. The method of claim 36, wherein the detection data comprises biological, chemical and/or nuclear contaminant concentrations.

38. The method of claim 36, wherein the detection data comprises weather conditions.

39. The method of claim 36, wherein the detection data comprises wind speed and/or wind direction.

40. The method of claim 35, further comprising implementing protective measures immediately following the detection of a contaminant release.

41. The method of claim 40, wherein the protective measures comprise medical response procedures for emergency rooms and hospitals.

42. The method of claim 40, wherein the protective measures comprise warning alarms, instructions for personal protection and/or news updates.

43. The method of claim 40, wherein the protective measures comprise sealing of at least one building and/or room.

44. The method of claim 40, wherein the protective measures comprise operation of at least one positive pressure system.

45. The method of claim 40, wherein the protective measures comprise introduction of clean air.

46. The method of claim 40, wherein the protective measures comprise closing of travel routes.

47. The method of claim 35, further comprising communicating the detected contaminant release via an information technology infrastructure prior to the response to the contaminant release.

48. The method of claim 35, wherein the sensors are selectively positioned by:
   identifying at least one potential contaminant release location within the outdoor area; and
   modeling a contaminant dispersion pattern using the at least one contaminant release location.

49. An array of selectively positioned sensors within an outdoor area, wherein positions of the sensors are determined by:
   identifying at least one potential contaminant release location within the outdoor area;
   modeling a contaminant dispersion pattern using the at least one contaminant release location; and
   positioning at least one of the contaminant sensors within the outdoor area based on the contaminant dispersion pattern.

50. The array of claim 49, wherein the sensors communicate using an information technology infrastructure.

* * * * *